US006650402B2

United States Patent
Sullivan et al.

(10) Patent No.: US 6,650,402 B2
(45) Date of Patent: Nov. 18, 2003

(54) OMNI-DIRECTIONAL CLOUD HEIGHT INDICATOR

(75) Inventors: Patrick K. Sullivan, Honolulu, HI (US); Christopher J. Sullivan, Honolulu, HI (US); Robert W. Deuel, Makawao, HI (US)

(73) Assignee: Oceanit Laboratories, Inc., Honolulu, HI (US)

( * ) Notice: Subject to any disclaimer, the term of this patent is extended or adjusted under 35 U.S.C. 154(b) by 0 days.

(21) Appl. No.: 09/780,441

(22) Filed: Feb. 12, 2001

(65) Prior Publication Data

US 2001/0043323 A1 Nov. 22, 2001

Related U.S. Application Data

(60) Provisional application No. 60/181,557, filed on Feb. 10, 2000.

(51) Int. Cl.[7] .................................................. G01C 3/08
(52) U.S. Cl. ........................................ 356/4.01; 356/5.01
(58) Field of Search ............................... 356/3.01–5.15

(56) References Cited

U.S. PATENT DOCUMENTS

| | | | | |
|---|---|---|---|---|
| 3,963,347 A | * | 6/1976 | Segre et al. ..................... 356/5 |
| 4,259,592 A | * | 3/1981 | Frungel et al. .............. 250/574 |
| 4,289,397 A | * | 9/1981 | Itzkan et al. ..................... 356/5 |
| 4,355,893 A | * | 10/1982 | Chicklis ........................... 356/4 |
| 4,502,782 A | * | 3/1985 | Werner et al. .................. 356/5 |
| 4,511,249 A | * | 4/1985 | Frungel et al. ................. 356/5 |
| 4,520,360 A | * | 5/1985 | Schwab ...................... 340/947 |
| 4,722,599 A | * | 2/1988 | Fruengel et al. ............... 356/5 |
| 4,807,158 A | * | 2/1989 | Blanton et al. ............. 364/521 |
| 5,241,315 A | * | 8/1993 | Spinhirne ..................... 342/54 |
| 5,751,830 A | * | 5/1998 | Hutchinson ................. 382/103 |
| 5,880,836 A | * | 3/1999 | Lonnqvist ................... 356/336 |
| 6,085,152 A | * | 7/2000 | Doerfel ........................... 702/3 |
| 6,123,067 A | * | 9/2000 | Warrick ...................... 126/593 |
| 6,133,990 A | * | 10/2000 | Miller et al. ............... 356/4.01 |
| 6,208,938 B1 | * | 3/2001 | Doerfel ........................... 702/3 |
| 6,246,468 B1 | * | 6/2001 | Dimsdale ................... 356/4.02 |
| 6,292,215 B1 | * | 9/2001 | Vincent ....................... 348/169 |

* cited by examiner

Primary Examiner—Thomas H. Tarcza
Assistant Examiner—Brian Andrea
(74) Attorney, Agent, or Firm—James Creighton Wray; Meera P. Narasimhan

(57) ABSTRACT

Apparatus and method is provided for 3-D measurement and visualization of cloud formations using ceilometers and computer software. Data collected from the ceilometers contains cloud range information in polar coordinates $(r,\theta,\pi)$ which is then converted to a cloud height depiction in a 3-D space. Visualization of data is enhanced by animating consecutive sets of data in a time loop to show the movement and evolution of the clouds over the measurement site during an extended period of time.

53 Claims, 11 Drawing Sheets

FIG. 1A
FIG. 1B
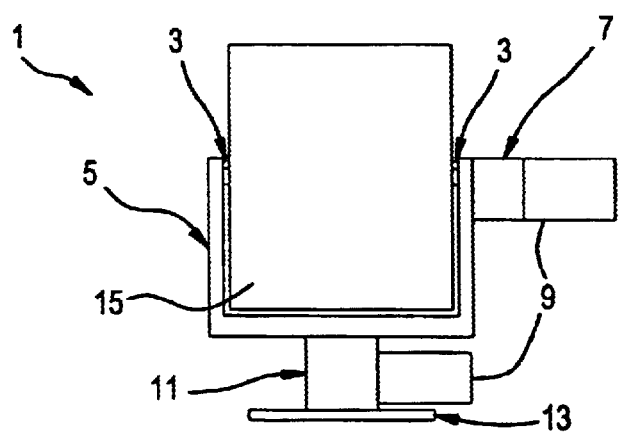
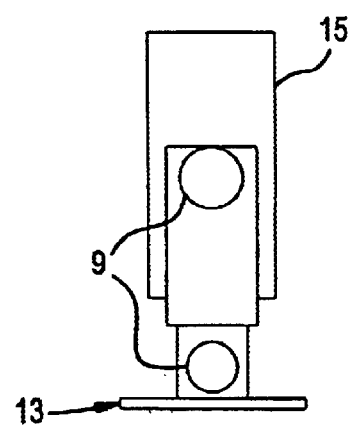

Cloud Height vs. Radius
□ Time=1245
□ Time=1256
□ Time=1307

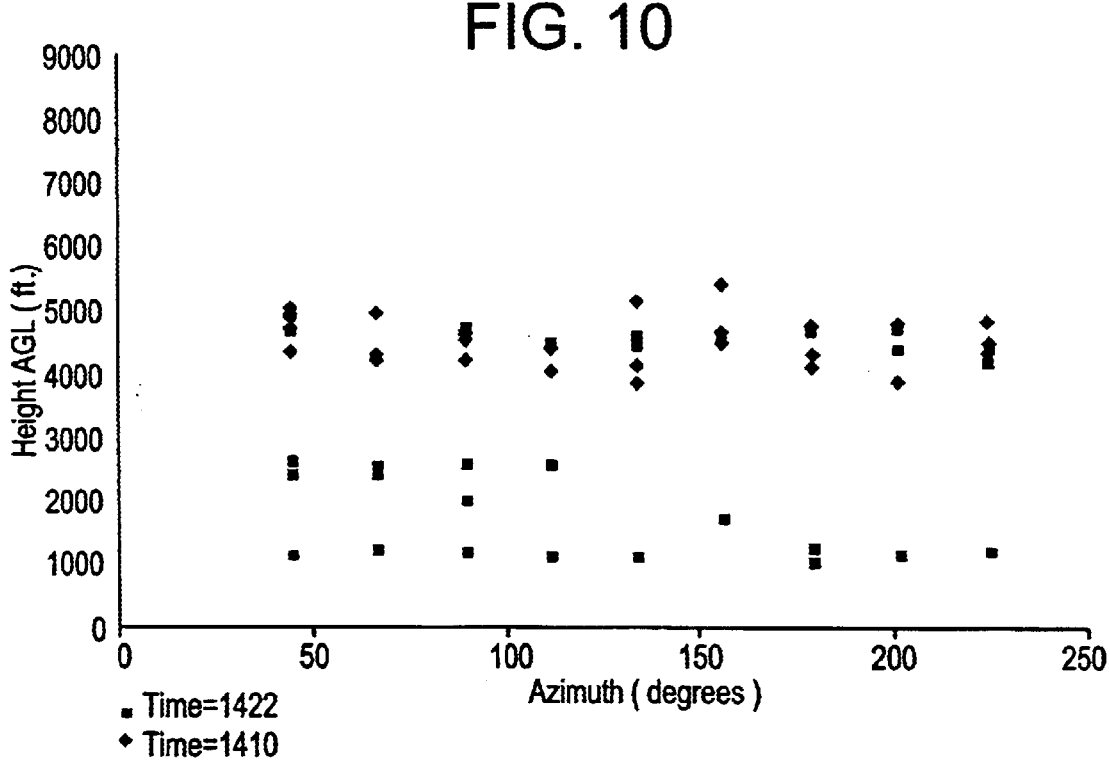
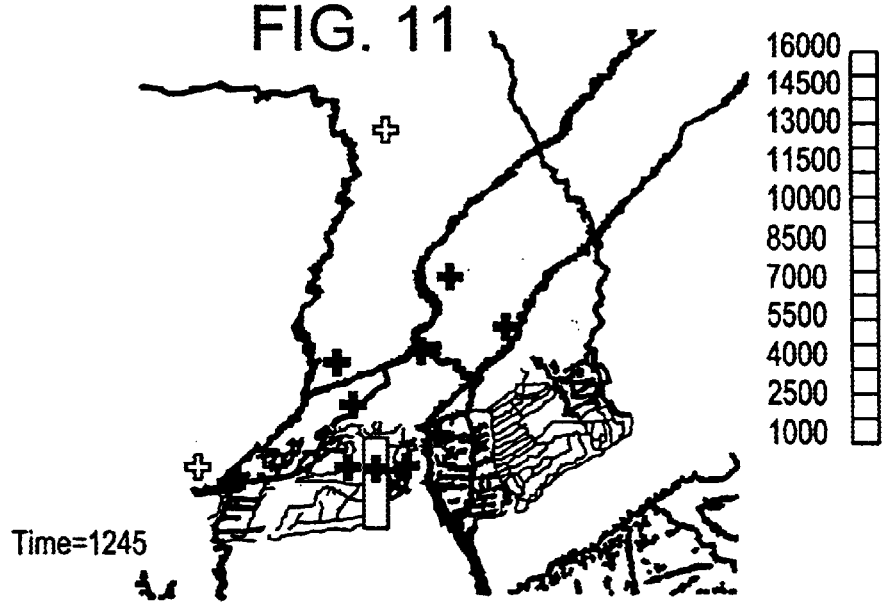

OMNI-DIRECTIONAL CLOUD HEIGHT INDICATOR

This application claims the benefit of U.S. Provisional Application No. 60/181,557, filed Feb. 10, 2000.

BACKGROUND OF THE INVENTION

The present invention relates to methods for determining cloud heights within a three-dimensional space.

Safety is a primary concern in the aviation industry. Unanticipated or unmeasured weather conditions can pose a threat to flight safety; accurate and appropriate weather information, particularly at airports, is therefore very important to pilots and to the air traffic control system. Visibility and ceiling information are of primary importance.

Ceiling is defined as the height above the ground from which prominent objects on the ground can be seen and identified or as the height above the ground of the base of the lowest layer of clouds when over half of the sky is obscured.

Ceilometers are devices designed to measure cloud height generally along a single dimension vertical line above the instrument. Common units use eye-safe pulsed diode lasers operating as LIDAR (light detection and ranging) devices. The outgoing laser beam is scattered by water droplets, and the backscattered beam is detected and analyzed by the ceilometer to determine characteristics of the scatterers (i.e., opaque or translucent clouds) and the range (derived from the transit time of the light beam).

The National Weather Service has installed Automated Surface Observing Systems (ASOS) at 900 airports. The ASOS system measure winds, temperature, dew point, pressure, visibility, rain, and ceiling or cloud height as a stand-alone automated system. This system provides weather data in METAR code for meteorologists and others within the aviation industry.

A significant limitation of the ASOS system is that cloud height data is one-dimensional because cloud height information is only measured along a single vertical path above the instrument. The standard instrument used in this application is the Vaisala CT-12K Light Detection and Ranging (LIDAR) ceilometer, which has a range of approximately 12,000 feet. Currently, the National Weather Service is upgrading from the CT-12K to the CT-25K ceilometer, which has a range of approximately 25,000 feet.

As part of this upgrade, the National Weather Service is interested in providing more information on ceilings and in providing data acquisition that will more adequately describe cloud heights over a larger area. Improving this technology to provide more information is a continuing effort.

SUMMARY OF THE INVENTION

The invention provides ceiling information in three dimensions, which covers all areas of a major airport, and which provides significant improvements over existing systems.

The present invention provides a method of 3-D measurement and visualization of cloud formations using a ceilometer and computer software. Data collected from the ceilometer contains cloud range information in polar coordinates (r,θ,π) which is then converted to a cloud height depiction in a 3-D space. Visualization of data is enhanced by animating consecutive sets of data in a time loop to show the movement and evolution of the clouds over the measurement site during an extended period of time.

The omni-directional platform described herein includes physical hardware and motion control computer hardware and software. The invention is produced for potential application to both the Vaisala CT-25K and the CT-75K ceilometers, as well as ceilometers from other manufacturers. The CT-75K has an approximate range of 75,000 feet and utilizes an array of four CT-25K ceilometers housed in a single enclosure and operating in parallel.

Pointing hardware can be either a combination of servo motors and gears that physically control the orientation of the ceilometer, or a scanning mirror configuration where servo motors control a gimballed mirror that reflects the ceilometer output and return at specified angles.

The data acquisition and control system of the present invention controls the motion of the ceilometer or mirror and acquires data from the units. Running on a personal computer or on an embedded system, motion control and data acquisition routines command motion control boards and data acquisition boards connected to the computer's motherboard.

Conventional use of the CT-25K system for measurement of cloud height produces only a single reading at any instant in time. The present invention provides utilization of the instrument in a scanning mode and provides processing and display of the data in three dimensions. The Interactive Data Language (IDL®) developed by Research Systems, Inc. (RSI) was selected for this purpose. IDL has an array-oriented architecture specially developed for handling large amounts of complex data and has been widely used in a variety of applications including meteorology, astronomy, and fluid dynamics. IDL's ability to manipulate and display three-dimensional images is especially notable.

For 3-D displays of the cloud hit data, it is necessary to create a 3-D data-element representation that reflects the spatial resolution of the measurement. Cloud ceiling height measurements are performed with constant elevational and azimuthal increments.

Once the 3-D model is created, it is manipulated to produce views from anywhere in the field, or to provide "fly-by" simulations. Additionally, multiple data sets are incorporated into a movie format for temporal data visualization.

Elevation angles are measured with a mechanical inclinometer, with a measurement precision of +/−0.5 degrees. Azimuth angles are determined from compass measurements, pointing markers or sensors on the pedestal base and fixed reference indicators.

The present invention employs a new version of the Vaisala system, the CT-75k, which has a range of 75,000 feet. Coupling this device with an Az-El (azimuth/elevation) scanning system allows probing the atmosphere in three dimensions around the device location to a range of nearly 15 miles. The data output from the ceilometer is processed by a computer along with elevation and azimuth angles from shaft encoders on the scanning mechanism to produce a true three dimensional set of data for the scanned volume.

Scanning methods of the Omni-Directional Cloud Height Indicator include pointing the entire LIDAR unit or employing rotating mirrors to deflect the laser beam throughout the probed volume.

The rotating mirror version utilizes a LIDAR ceilometer that is permanently mounted to a pedestal with the output window facing below the horizon. A two-axis pan/tilt scanning mirror system is mounted to the output end of the ceilometer. The pan/tilt mirror is mechanically rotated in two axes using a pair of stepper motors. Accurate microstepping is accomplished using a stepper-motor controller/driver electronics card with 16-bit precision. The micro-stepping feature enables 10-arcminute incremental positioning of the pan/tilt mirror. Each step corresponds to 10-arcminutes of mirror motion and therefore a 20-arcminute angular deviation of the optical axis. Mirror movement provides for 170 degrees of deflection, of the optical axis, in one axis and 110 degrees in the second axis.

A three-dimensional, cloud height model is generated by scanning through a solid angle using the mirror pan/tilt scanning system. At each location in the scan matrix, cloud height information is calculated by the ceilometer. The scan mirror contains a highly reflective durable coating in accordance with Military-Specification Mil-C-48497. The coated mirror surface defects shall not exceed a scratch-dig value of 80–50 and the surface figure shall not contain errors that exceed 0.001 inch/inch.

The scanning mirror system is lightweight, low cost and eliminates the need to scan the large mass of the ceilometer system. An enclosure housing covers the mirror scanning mechanism and contains an optical window that transmits the laser beam. The enclosure protects the system and all moving parts from being exposed to adverse weather conditions.

Besides the scanning function, the platform determines the pointing angles, both elevation and azimuth, of the LIDAR beam. Devices such as shaft encoders are employed on both axes to provide the required pointing information. Pointing information is sent to the computer along with the LIDAR backscatter data.

To obtain the maximum range of the LIDAR, the dwell time per unit data is 15 seconds. Depending upon the density of data points desired (and thus the size of the angular steps in both elevation and azimuth), a scan of the hemisphere requires a significant amount of time (i.e., up to a few tens of minutes for 8 points per azimuth scan and 10 elevation angles). Thus, the data output for a complete scan of the hemispheric volume may be limited to several sets per hour. Alternatively, dwell time is reduced, or instruments are duplicated.

The new ceilometer is capable of scanning in three dimensions to detect clouds within a range of 75,000 feet (about 15 miles), using a Vaisala CT-75k ceilometer, which has a nominal range of 75,000 feet. The ceilometer is operated on a scan and tilt platform to probe the atmosphere in a hemisphere above the ground plane. The cloud height (or range) data from the laser backscatter is analyzed and processed by a computer to convert range and angle measurements into a three dimensional plot of clouds within the probed volume.

The ceilometer is used on a scan and tilt platform also to detect low clouds and fog near the horizontal plane.

Available CT-25k ceilometers may be used. The CT-75k version increases the range of measurement from 25,000 feet (4.7 miles) to 75,000 feet (14.2 miles). The extended range plus the expansion of probed volume from a single dimension (fixed vertical beam) to the three dimension scan (probing the above-ground hemisphere) are major improvements over current cloud height measurements.

These and further and other objects and features of the invention are apparent in the disclosure, which includes the above and ongoing written specification, with the claims and the drawings.

BRIEF DESCRIPTION OF THE DRAWINGS

FIGS. 1A and 1B are front and side views of the ceilometer apparatus of the present invention in the direct-pointing configuration.

FIG. 10 graphically illustrates cloud height measurements versus azimuth angles from 45 degrees to 225 degrees at times 14:22 and 14:10.

FIG. 11 shows a plan view of cloud heights at time 12:45.

DETAILED DESCRIPTION OF THE PREFERRED EMBODIMENTS

Figure 1C:
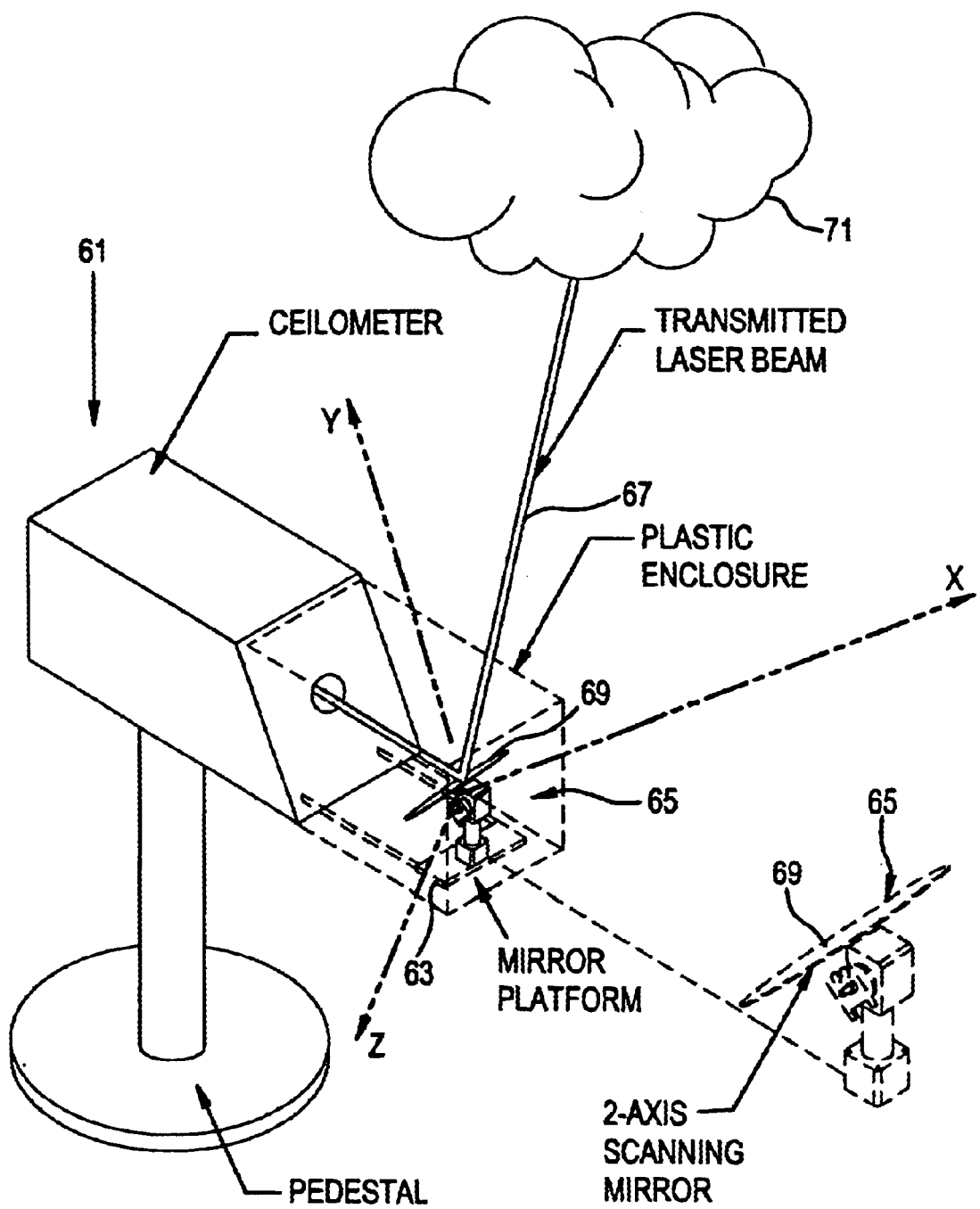
FIG. 1C illustrates the scanning mirror configuration of the present invention.

FIGS. 1A and 1B illustrate the omni-directional platform configuration of the new scanning ceilometer 1. FIG. 1A is a front elevation; FIG. 1B is a side elevation. A ceilometer 15 is mounted on support arms 5 for universal movement. The ceilometer 15 may be a cluster of parallel or slightly angularly offset ceilometers, for example a group of four ceilometers. A servo motor 9 drives a 100:1 reduction gear 7 that rotates the ceilometer about its horizontal axis upon load bearings 3. Load bearings 3 are installed on both sides of the support arms 5, and a Bayside 100:1 gear reducer 7 is attached in-line along the shaft, which is connected to a Parker Compumotor® servo motor 9 that provides power to the shaft of the gear reducer 7. The bottom of the support arm 5 is secured to a Bayside 100:1 right angle gear reducer 11, with a turntable configuration that is driven by a Parker Compumotor® servo motor 9. The lower servo motor and the gear reducer/turntable 11 are mounted on a platform base 13. The server motors 9 are equipped with shaft encoders, enabling precise position measurement. A PC-based controller board interfaces with the motor amplifiers and shaft encoders to direct motion, to control the servo motors 9, and to determine shaft positions. National Instruments® Lab-VIEW® software, running on the PC, is used to drive the controller board and to process position information as well as to perform data acquisition, analysis and communication. Features for the motion-control hardware are given in the Table 1, where $T_r$ is rated output torque, $T_{cs}$ is the rated continuous stall torque, $T_p$ is the rated peak torque, $\Delta\theta_e$ is the encoder angular resolution, and $\Delta\theta_c$ is the controller position.

TABLE 1

Omni-directional scanning platform motion-control component feature listing

| Planetary Gear Reducer (100:1) | Planetary Gear Reducer (100:1) | Servo Motors (2) | Motor Driver (2) | Motion Control Board |
|---|---|---|---|---|
| Tr = 1600 in-lbs. Turntable Output | Tr = 300 in-lbs. | $T_{cs}$ = 5.75 lb-in $T_p$ = 28.75 lb-in $\Delta\theta_e$ = 21.6 arc-min | Torque Mode PWM $\Delta\theta_c$ = +/−2 arc-min | PC-based 1 to 4 axes 12 bit 40 Mb memory 5 kHz acq. Rate |

FIG. 1C shows the ceilometer 61 in the scanning mirror configuration. A platform 63 with a gimballed-mirror assembly 65 is mounted at the end of the ceilometer 61. The transmitted laser 67 beam reflects off of the mirror surface 69 toward the target area 71. Backscattered light is in turn transmitted back to the mirror 69 from the cloud 71 and reflected to the ceilometer 61 for sensing. The mirror 69 is controlled using servo motors.

Figure 2:
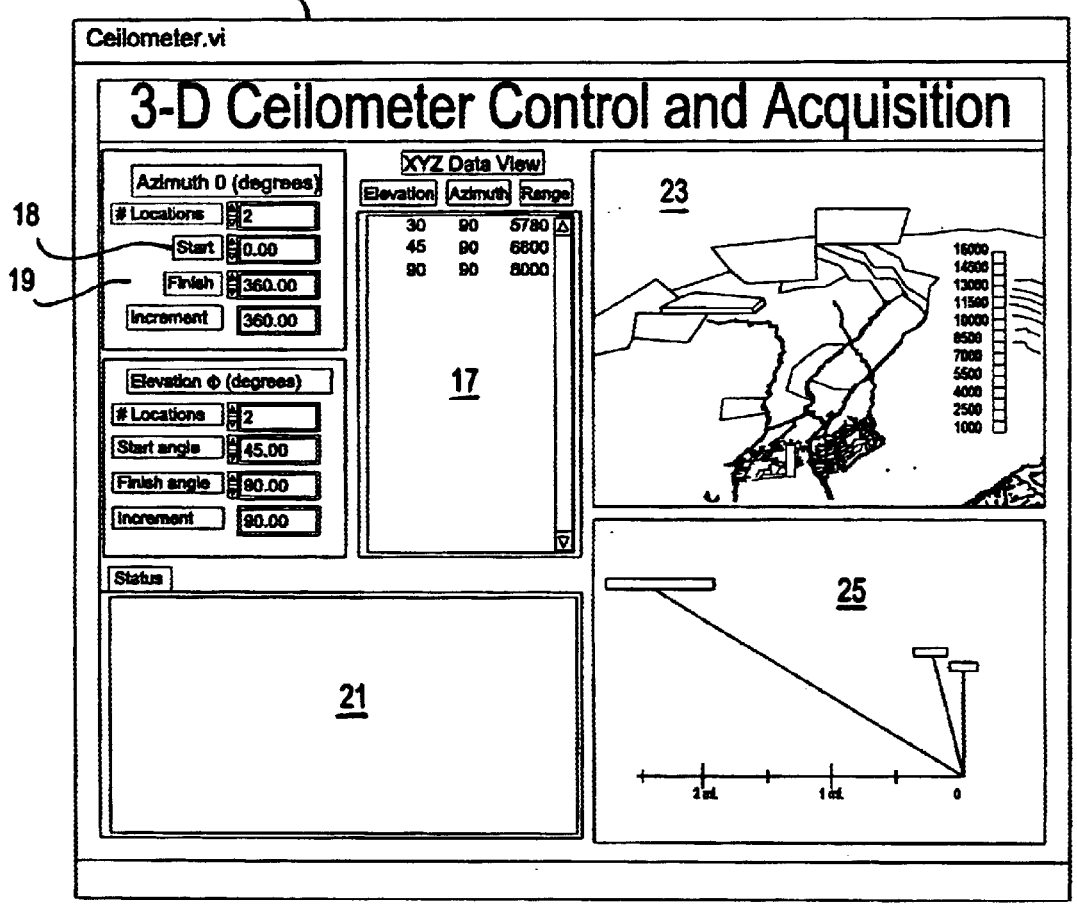
FIG. 2 illustrates the ceilometer scanning control and data acquisition PC application front panel.

FIG. 2 shows the front panel 22 of the data acquisition system 20 that controls both the motion of the ceilometer and acquire data from the unit. Preliminary data-acquisition software was developed using LabVIEW®, a product of National Instruments®. LabVIEW is an object oriented graphical programming language based on sub-codes written in C. Running from a PC, motion control and data acquisition routines command motion-control boards and data acquisition boards connected to the PC motherboard. The motion-control boards and the PC motherboard control servo motors 9. Additional embodiments for client or server Internet communication, remote access of data, communication with other systems, printed reports, or integration of additional systems are also included. Up-down numerical input buttons 18 in the upper left panel 19 allow user inputs of angular increments and ranges for both azimuth and elevation. The status box 21 in the lower-left corner displays any errors associated with the LIDAR ceilometer unit and the motion control hardware or software. Data is displayed in the upper middle portion 17 of the screen 22 in numerical format, giving elevation, azimuth and range. A 3-D visualization 23 of the data and a landing approach cross-section 25 are presented in the right upper and middle portions of the screen 22.

Figure 3A:
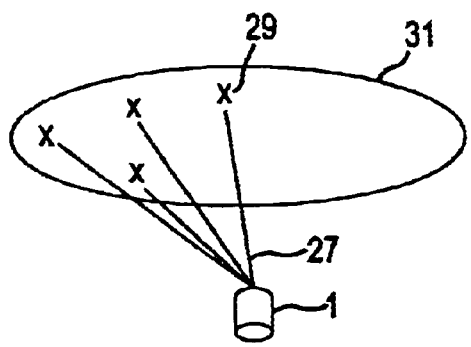
FIGS. 3A and 3B illustrate cloud measurement locations and corresponding sector representation.
Figure 3B:
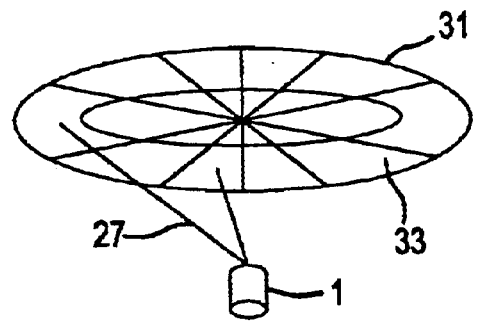

FIGS. 3A and 3B show a measurement grid display for a particular elevation plane 31. For a single-elevation cloud formation, shown in FIG. 3A, the scanning ceilometer 1 returns three-dimensional data corresponding to a level plane. The "X" marks 29 indicate where the LIDAR beam 27, scanning with constant angular increments, would intersect the single-elevation cloud formation. Individual measurements represent sub-quadrant sectors 33 on a horizontal plane 31, shown in FIG. 3B.

Figure 4A:
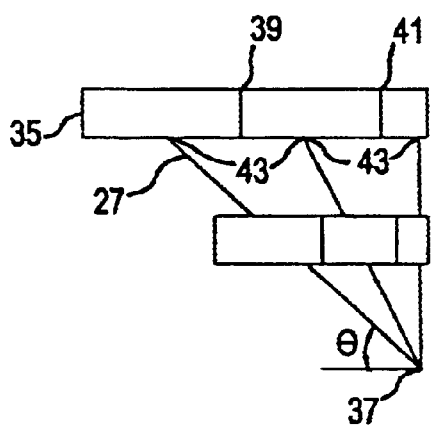
FIGS. 4A and 4B depict a plan view of spatial element representation of cloud-ceiling.
Figure 4B:
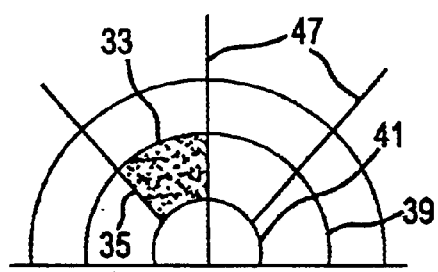

FIG. 4A illustrates the divergence of the LIDAR beam 27 with distance from the origin 37. This divergence causes the spatial measurement resolution to decrease with altitude. With this in mind, as shown in FIG. 4B, representation of the elemental data is made using sub-quadrant-shaped polygons 33 whose size is a function of the cloud ceiling height. The polygon object's dimensions were selected so that its size represented the spatial resolution of the measurement. The two diverging sides 47 are defined by the azimuthal measurement resolution. The inner arc 41 and outer arc 39 are defined as the midpoint radius between successive in-plane measurements 43 at a particular azimuth angle θ. Providing a nominal vertical thickness 35, the sector can be represented as a solid object in 3-D.

Figure 5A:
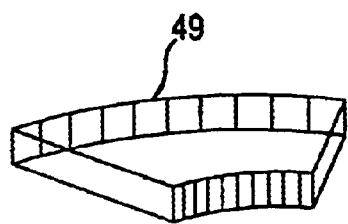
FIGS. 5A and 5B depict wire frame and solid illustration of cloud-hit element for 3-D visualization.
Figure 5B:
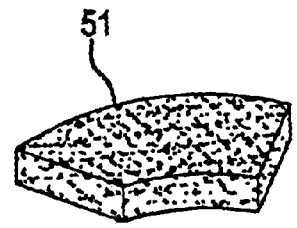

FIGS. 5A and 5B illustrate the wire frame version 49 and the shaded version 51 of the cloud-hit element for 3-D visualization.

Figure 6:
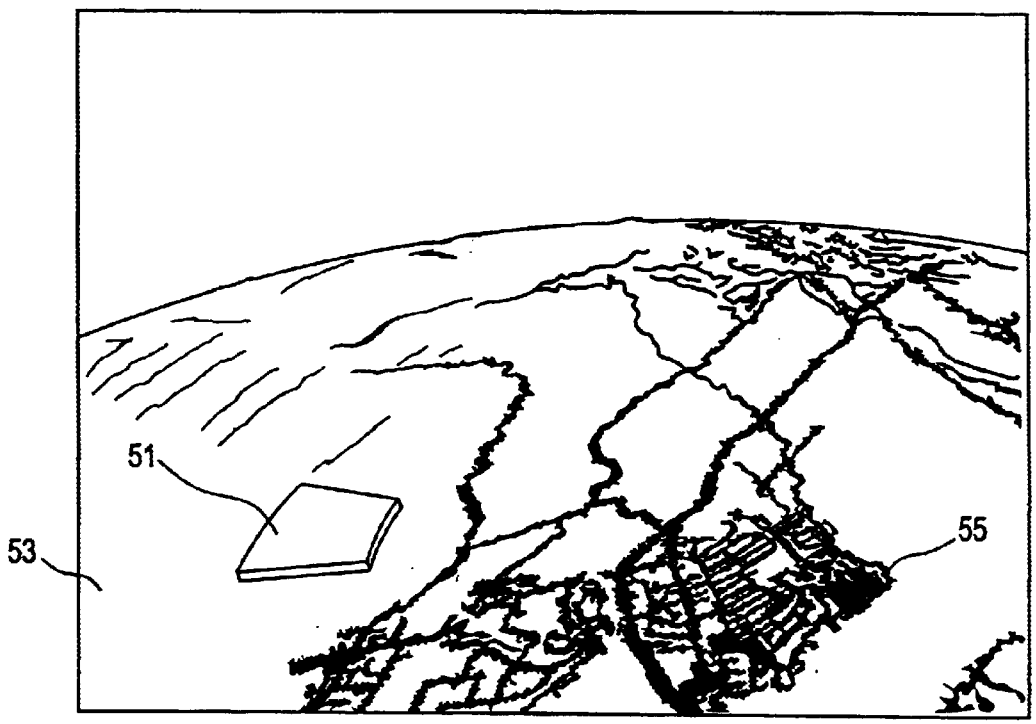
FIG. 6 illustrates a 3-D cloud hit element placed in a measured position over simulated terrain.

FIG. 6 shows a display of the data in the context of the measurement by means of a 3-D model of the terrain 53, created using a United States Geological Survey (USGS) Digital Elevation Model (DEM) grid and surface map of the area. The surface map is "stretched" over the surface grid rendering, creating a 3-D image of the terrain with surface features such as roads 55. This display helps relate the data to actual position in the measurement volume. The 3-D wedge section 51 is then placed in the proper position and orientation to indicate the location of the cloud ceiling relative to the terrain 53.

Figure 7:
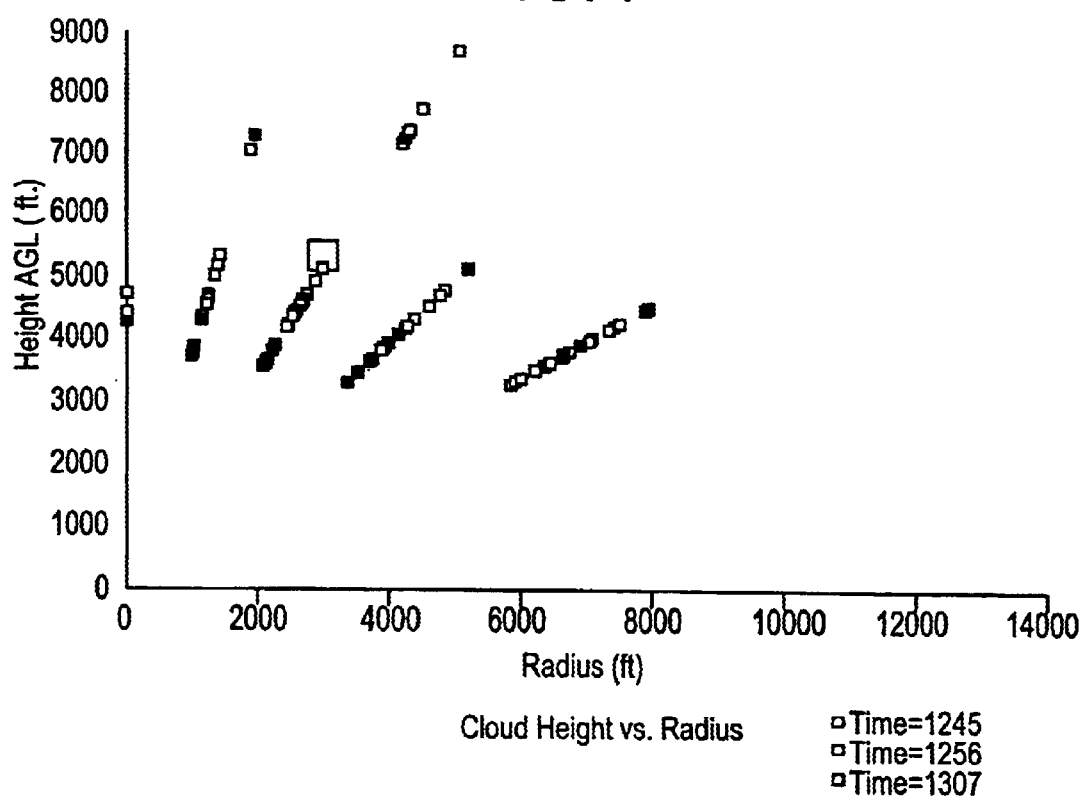
FIG. 7 graphically illustrates cloud height measurements versus radii at times 12:45, 12:56, and 13:07 for different ceilometer angles.

FIG. 7 graphically depicts cloud heights measured by the apparatus at times 12:45, 12:56, and 13:07. This representation shows two distinct cloud layers centered at 4500 feet and 8000 feet above ground level (AGL). The reduced number of upper layer measurements is indicative of laser beam attenuation by intervening clouds.

Figure 8:
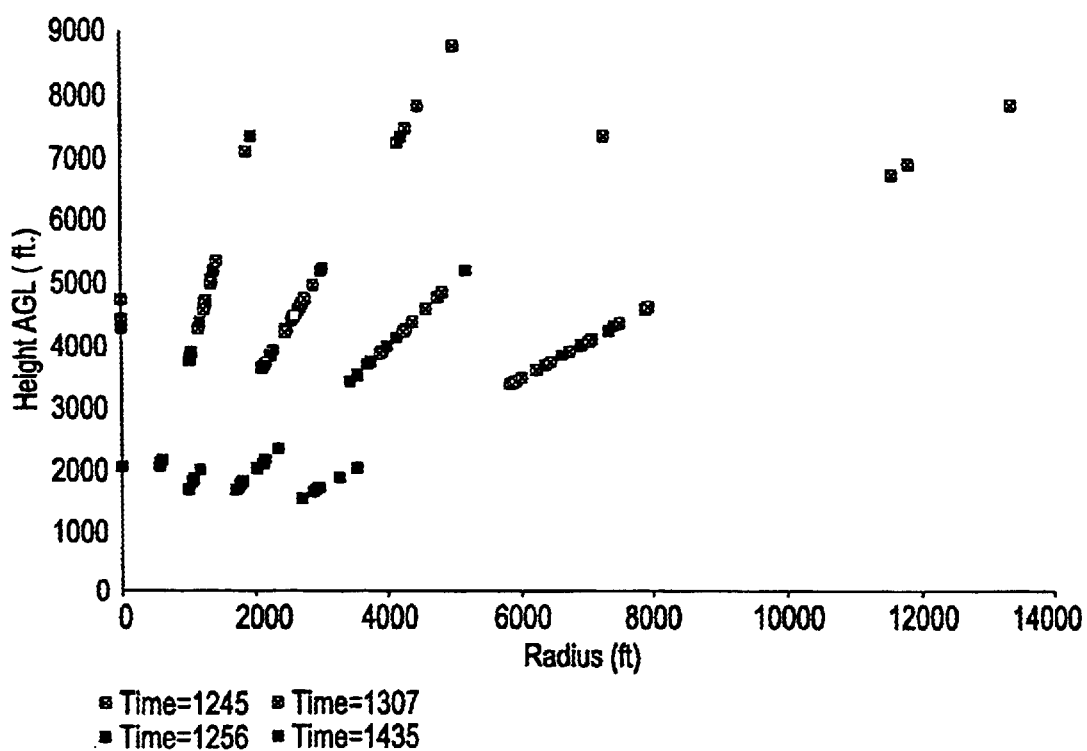
FIG. 8 graphically illustrates cloud height measurements versus radius at time 12:45, 12:56, 13:07 and 14:35 for different ceilometer angles.

FIG. 8 graphically depicts cloud heights measured by the invention at times 12:45, 12:56, 13:07, and 14:35. Comparisons with FIG. 7 reveal movement at a later time (14:35) of a lower cloud deck into the area at 2000 feet AGL.

Figure 9:
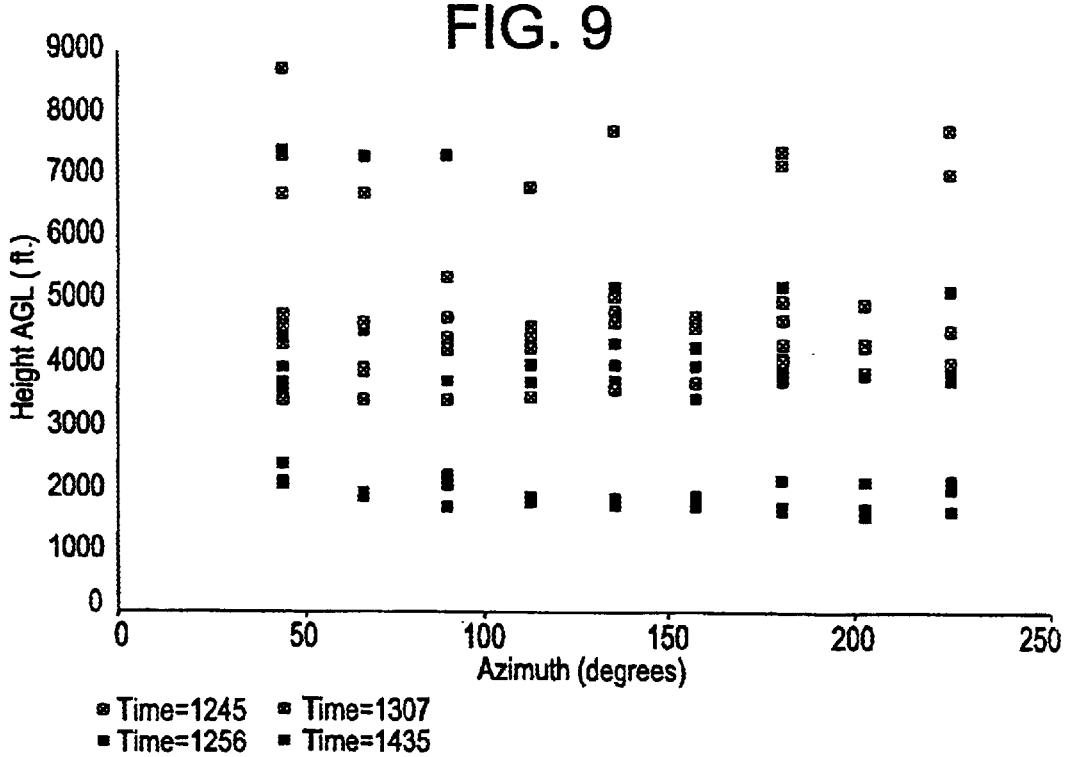
FIG. 9 graphically illustrates cloud height measurements versus azimuth angles from 45 degrees to 225 degrees between the times of 12:45 and 14:35.

FIG. 9 graphically depicts the same cloud data from FIG. 8 as "cloud hits" for heights versus azimuth. This figure more clearly shows that cloud layers extended over all the probed azimuths (from 45 degrees Northeast, to 225 degrees Southwest) in a fairly uniform pattern. The cloud layer near 4000 feet was detected in all directions during earlier measurement sequences. Later, at 14:35, the lower cloud deck (near 2000 feet) was also detected in all directions. Although the azimuthal pattern (or lack thereof) is discernable here, there is no indication of the horizontal extent of the clouds in a radial direction for any particular azimuth.

FIG. 10 shows two data sets for intermediate times 14:10 and 14:22. The earlier data set indicates only a single cloud layer at 4000 to 5000 feet, while the later one shows both an upper layer between 4000 and 5000 feet and a lower layer with a base near 1000 feet in all probed directions. These two data sets demonstrate that a change in cloud levels at a low altitude (in this case, 1000 feet) may occur in less than the 10 minutes it took to complete one data. This is explained by the fact that a 30 degree elevation angle was used, thereby limiting the range of detection to 2000 feet horizontal range from the LIDAR. However, this horizontal range need not be a problem for an airport environment where there are no adjacent occupied structures that would preclude low angle scanning. Reducing the minimum elevation angle to 5 degrees would extend the horizontal range to about 11,000 feet for a layer at 1000 feet altitude.

Figure 12:
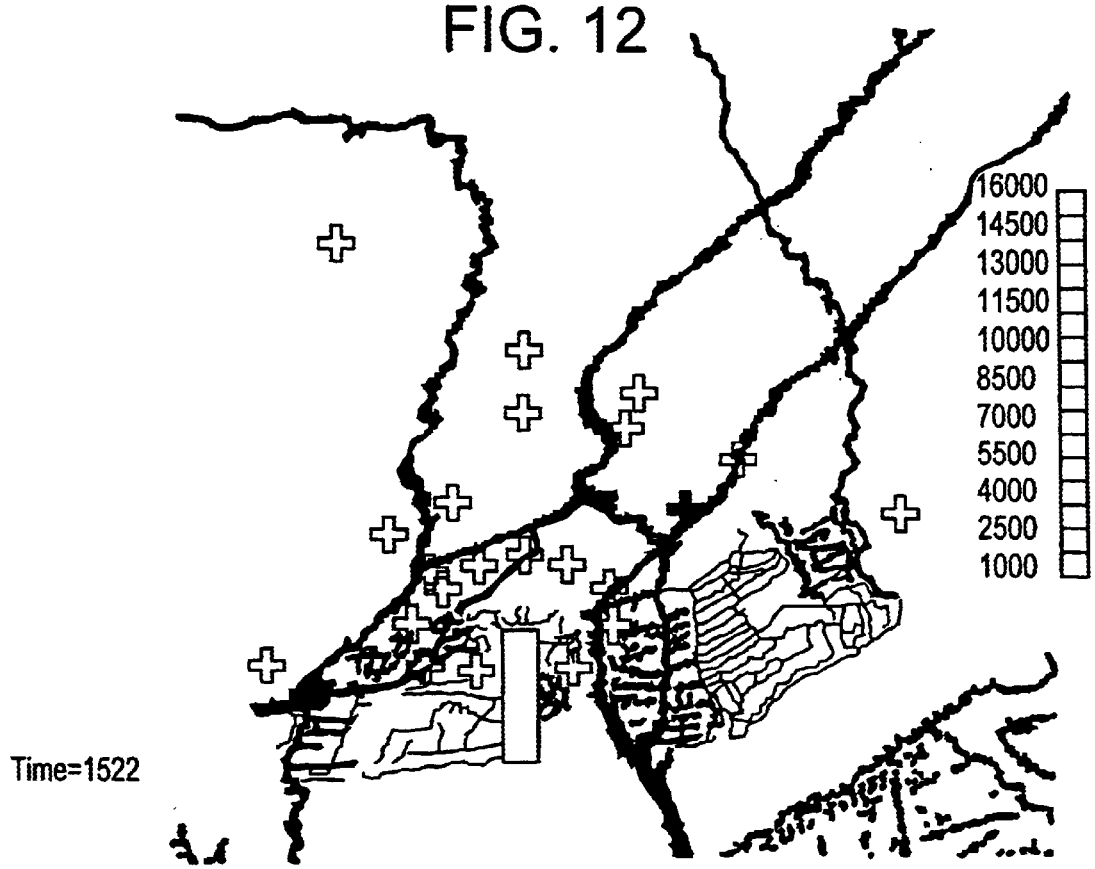
FIG. 12 shows a plan view of cloud heights at time 15:22.
Figure 13:
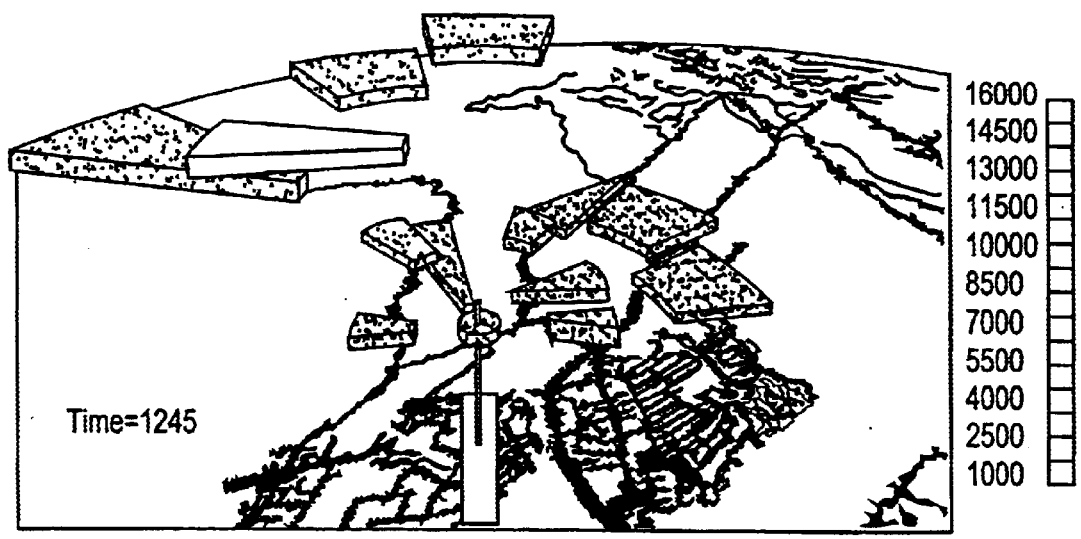
FIG. 13 shows a 3-D perspective view of cloud ceilings at time 12:45.
Figure 14:
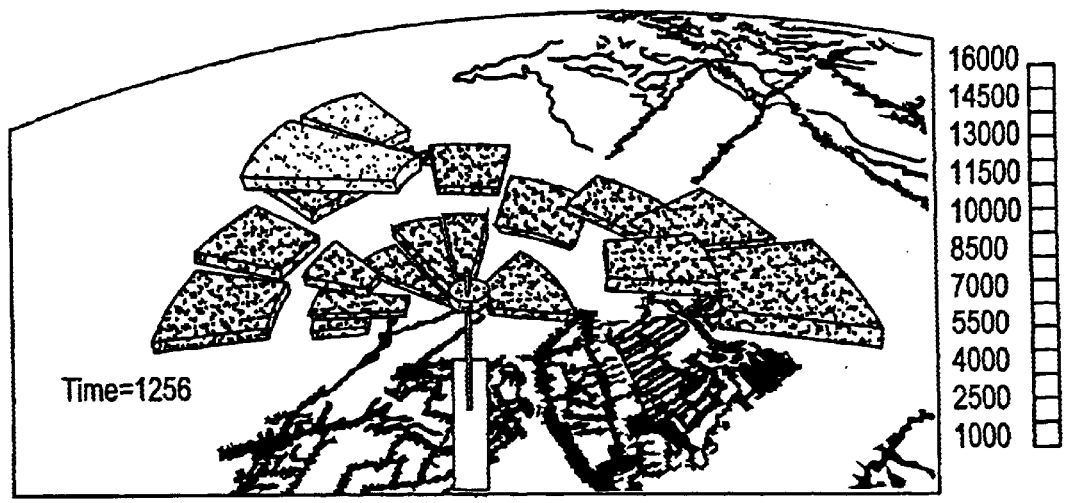
FIG. 14 shows a 3-D perspective view of cloud ceilings at time 12:56.
Figure 15:
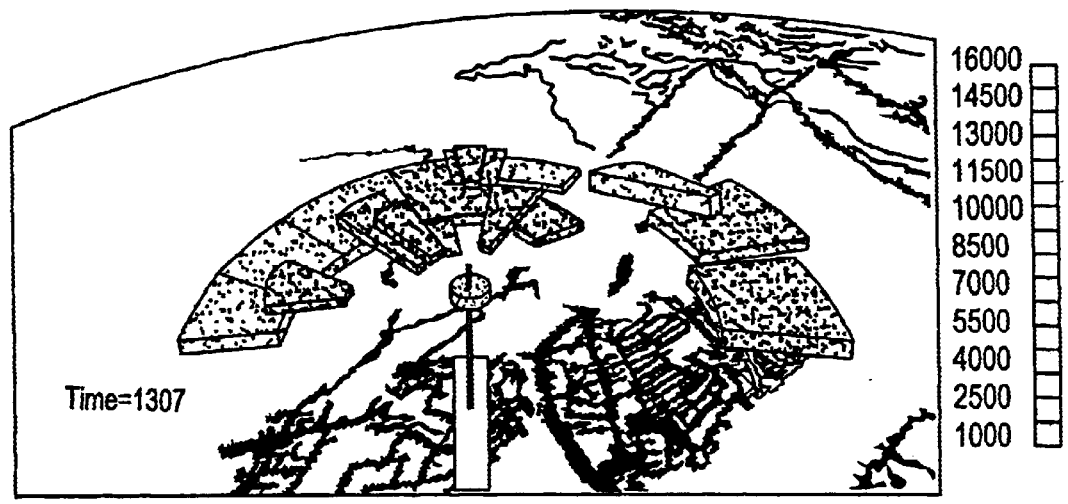
FIG. 15 shows a 3-D perspective view of cloud ceilings at time 13:07.
Figure 16:
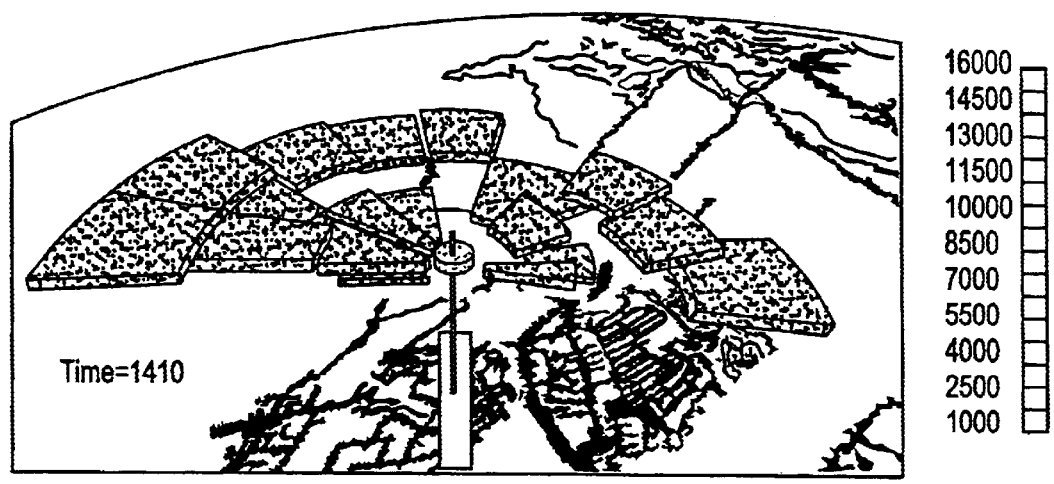
FIG. 16 shows a 3-D perspective view of cloud ceilings at time 14:10.
Figure 17:
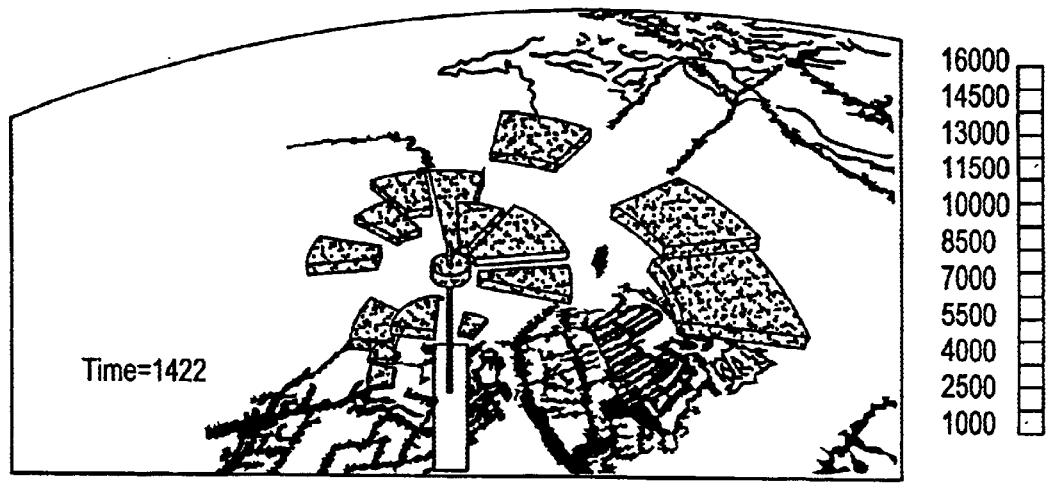
FIG. 17 shows a 3-D perspective view of cloud ceilings at time 14:22.
Figure 18:
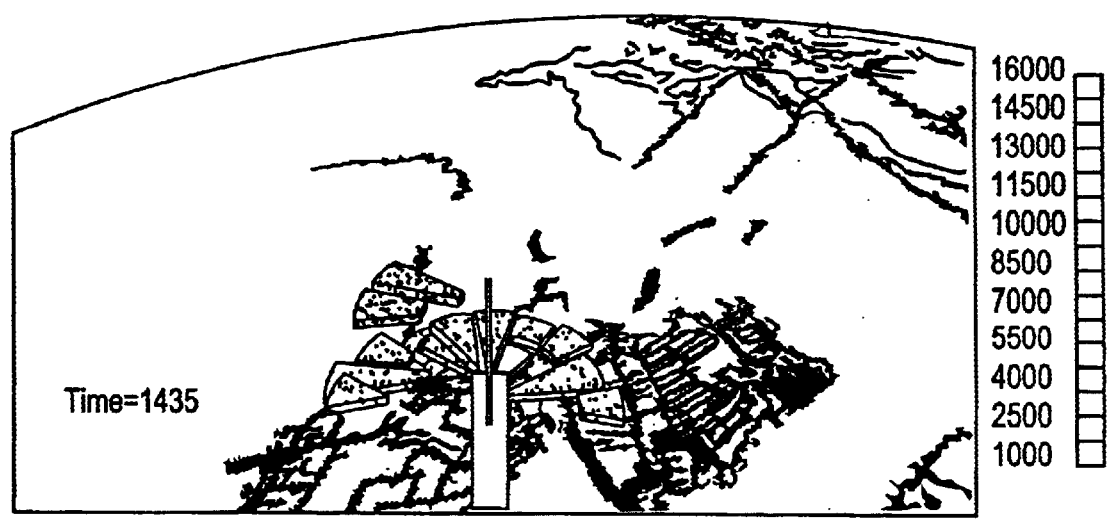
FIG. 18 shows a 3-D perspective view of cloud ceilings at time 14:35.

FIGS. 11 and 12 show plan view plots for times 12:45 and 15:22. These plots show the detected clouds overlaying a simple map of the actual area and centered upon the point where the data was collected. The view is looking down on the clouds and the terrain below from an overhead position. All clouds detected are shown as shaded crosses surrounding the LIDAR location, which is indicated by the thick vertical bar near the bottom center. In order to differentiate the cloud heights measured by the LIDAR, each cloud segment is shaded, or colored, in accordance with the altitude scale shown on the figure (note that in subsequent figures, the cloud altitudes are given in feet above sea level). This type of view has the advantage of a relatively clear representation of the cloud coverage over the XY horizontal plane. Colors, or shading in the data plots indicate the cloud height.

FIGS. 13 through 18 illustrate perspective plots of cloud height data. These views present a more realistic look at the clouds as they would be seen by an observer near the LIDAR location but at an elevated position. To enhance the realism of this view, the cloud height data is overlaid on a contour map of the terrain. A comparison of these figures reveals some of the details observed with the passage of time. It is apparent that the coarseness of the spatial grid attained during this experiment precludes resolution of individual cloud edges and shapes, but it allows for observation of the general motion and progression of the clouds over time. Thus, a 3-D perspective view shows the radial extent, the azimuthal distribution, and the temporal evolution of the cloud field.

Figure 19:
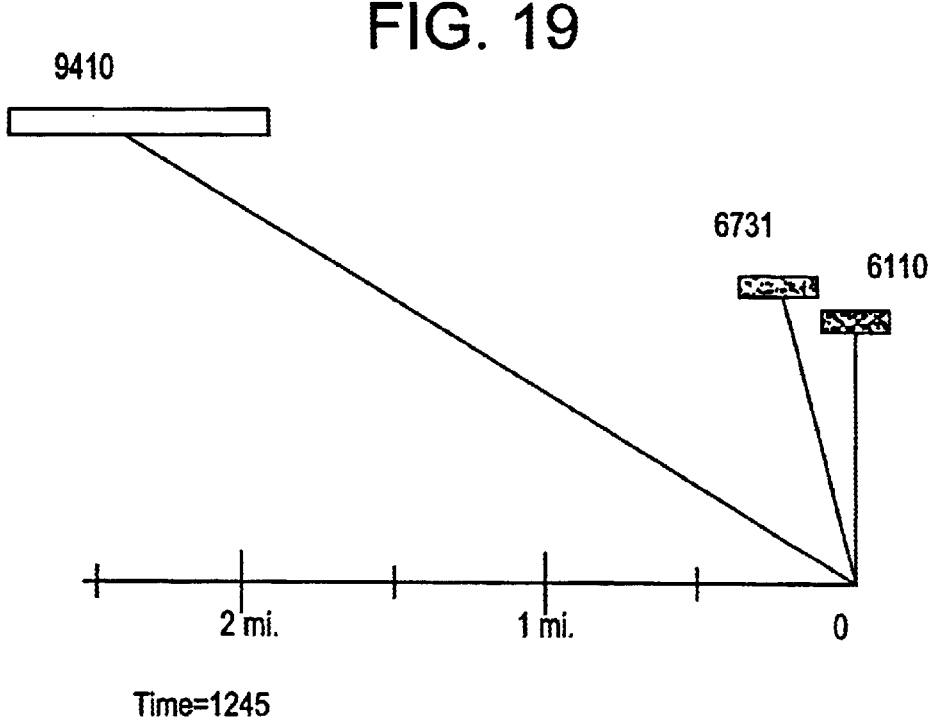
FIG. 19 graphically illustrates a vertical cross-section view of cloud ceilings at time 12:45.

FIG. 19 graphically depicts a vertical slice through the 3-D data in a plane from an observer looking towards one specific azimuth. In this example, only three cloud hits were measured and are represented by shading and text label. An advantage of this display is that the cloud heights along a particular path are seen from the side, clearly showing the relationship between the clouds and the ground. Such a display is an aid if one wants to project an aircraft's flight path against the measured clouds in a specified direction as a function of distance.

While the invention has been described with reference to specific embodiments, modifications and variations of the invention may be constructed without departing from the scope of the invention, which is defined in the following claims.

We claim:

1. A method for determining omni-directional cloud heights comprising collecting data including 3-D measurement and visualization of cloud formations in a site with a ceilometer, determining cloud range information in polar coordinates r,θ,π from the collected data, and converting the determined information to a cloud height visualization in 3-D space.

2. The method of claim 1, wherein the visualization comprises enhancing the collected data and animating consecutive sets of data in a time loop, showing movement and evolution of clouds over the site during an extended period of time.

3. The method of claim 1, further comprising computing the collected data with hardware and software, and outputting computed data on a display.

4. The method of claim 1, wherein the ceilometer is a VAISALA CT-25K or a VAISALA CT-75K ceilometer.

5. The method of claim 3, further comprising physically controlling orientation of the ceilometer with servo motors and gears included in the hardware.

6. The method of claim 3, further comprising controlling a scanning mirror configuration having a gimballed mirror with servo motors.

7. The method of claim 6, further comprising providing an output from the ceilometer, reflecting the output and a return of the output with the gimballed mirror at specific angles.

8. The method of claim 1, further comprising controlling motion of the ceilometer with a data acquisition and control system and acquiring data relating to all coordinates of the cloud formations.

9. The method of claim 8, wherein the controlling comprises motion control and data acquisition routines and commanding motion control boards and data acquisition boards connected to a computing system.

10. The method of claim 1, wherein the determining comprises determining using a scanning mode, processing the data and displaying the data in three-dimensions.

11. The method of claim 10, wherein the determining further comprises creating a 3-D model reflecting a spatial resolution of the measurement.

12. The method of claim 11, further comprising determining cloud ceiling height with constant elevational and azimuthal increments.

13. The method of claim 12, wherein the determining comprises determining elevation angles with a mechanical inclinometer.

14. The method of claim 12, wherein the elevation angles comprise a measurement precision of +/−0.5 degrees.

15. The method of claim 12, wherein the determining comprises determining azimuth angles from a group consisting of compass measurements, pointing markers or sensors.

16. The method of claim 11, wherein the determining further comprises manipulating the 3-D model for generating different views from different locations in a field.

17. The method of claim 11, further comprising generating "fly-by" simulations with the 3-D model.

18. The method of claim 11, further comprising incorporating multiple data sets into a movie format for temporal data visualization.

19. The method of claim 11, wherein the creating a 3-D model comprises generating the model by scanning through a solid angle using a mirror pan/tilt scanning system.

20. The method of claim 19, wherein the scanning comprises forming a scan matrix and calculating cloud height information within locations in the scan matrix by the ceilometer.

21. The method of claim 20, wherein the scanning comprises scanning in three dimensions to detect clouds within a range of about 75,000 feet.

22. The method of claim 21, further comprising analyzing and processing data from a laser backscatter and converting range and angle measurements into a three dimensional plot of clouds within a probed volume.

23. The method of claim 22, further comprising detecting low clouds and fog near a horizontal plane.

24. Apparatus for determining omni-directional cloud height comprising a data acquisition system comprising a ceilometer mounted on support arms for universal movement, a gear connected to the ceilometer, and a servomotor for driving the gear and rotating the ceilometer about an horizontal axis and measuring and outputting cloud height information in all axes.

25. The apparatus of claim 24, wherein the ceilometer comprises a cluster of parallel or slightly angularly offset ceilometers.

26. The apparatus of claim 24, further comprising load bearings installed on sides of the support arms.

27. The apparatus of claim 24, further comprising a gear reducer attached in-line along a shaft connected to a servo motor for powering the shaft of the gear reducer.

28. The apparatus of claim 24, further comprising a right angle gear reducer connected to a bottom of the support arms.

29. The apparatus of claim 28, wherein the gear reducer has a turntable configuration driven by the servo motor.

30. The apparatus of claim 29, wherein the servo motor and the turntable are mounted on a platform base.

31. The apparatus of claim 24, wherein the servomotor comprise with shaft encoders for precise position measurement of clouds.

32. The apparatus of claim 31, further comprising a computing device having a controller board interfacing with motor amplifiers and the shaft encoders for directing motion, controlling the servo motors and determining shaft positions.

33. The apparatus of claim 32, further comprising software for driving the controller board and processing position information as well as performing data acquisition, analysis and communication.

34. The apparatus of claim 24, wherein the data acquisition system controls a motion of the ceilometer and acquires data therefrom.

35. The apparatus of claim 34, further comprising software for performing motion control and data acquisition routines, commanding motion-control boards and data acquisition boards connected to the computing device.

36. The apparatus of claim 35, wherein the motion-control boards and the computing device control the servomotor.

37. The apparatus of claim 35, further comprising means for client communication, means for server internet remote access, means communication with other data systems, printed reports, and means for integration of additional data systems.

38. The apparatus of claim 35, further comprising input buttons on a panel of the data system for user inputs of angular increments and ranges for azimuth and elevation.

39. The apparatus of claim 35, further comprising a display for displaying status and errors associated with the data system.

40. The apparatus of claim 39, wherein the display provides information on elevation, azimuth and range of clouds.

41. The apparatus of claim 40, further comprising a 3-D visualization of data.

42. The apparatus of claim 41, further comprising a measurement grid display for a particular elevation plane.

43. The apparatus of claim 42, further comprising scan measurements including measurements representing sub-quadrant sectors on a horizontal plane.

44. The apparatus of claim 40, further comprising a LIDAR beam source for directing a beam to the clouds and measuring divergence.

45. The apparatus of claim 44, wherein the divergence provides a spatial measurement resolution decreasing with altitude.

46. The apparatus of claim 45, wherein the measurements further comprise elemental data as sub-quadrant-shaped polygon, wherein a size of the polygon is proportional to a function of a cloud ceiling height.

47. The apparatus of claim 46, wherein dimensions of the polygon represent a spatial resolution of the measurement.

48. The apparatus of claim 47, wherein two diverging sides of the polygon provide azimuthal measurement resolution, inner arc and outer arcs are a midpoint radius between successive in-plane measurements at a particular azimuth angle $\theta$, and a nominal vertical thickness provides a solid object in 3-D.

49. The apparatus of claim 48, further comprising a 3-D model of surface terrain provided over a surface grid rendering for creating a 3-D image of the terrain and relating data to actual position in a measurement volume.

50. The apparatus of claim 49, further comprising a wedge section placed in proper position and orientation on the image for locating a cloud ceiling relative to the terrain.

51. The apparatus of claim 50, wherein the 3-D image provides radial extent, azimuthal distribution, and temporal evolution of a cloud field.

52. The apparatus of claim 24, further comprising an array-oriented architecture for handling measurement data.

53. The apparatus of claim 24, wherein the data system is provided in meteorology, astronomy, and fluid dynamics fields.

* * * * *